US007089957B2

(12) United States Patent
Schnell

(10) Patent No.: US 7,089,957 B2
(45) Date of Patent: Aug. 15, 2006

(54) REDUNDANT VALVE SYSTEM

(75) Inventor: Richard Edward Schnell, Oswego, IL (US)

(73) Assignee: Ross Operating Valve Co., Troy, MI (US)

( * ) Notice: Subject to any disclaimer, the term of this patent is extended or adjusted under 35 U.S.C. 154(b) by 202 days.

(21) Appl. No.: 10/756,018

(22) Filed: Jan. 13, 2004

(65) Prior Publication Data

US 2005/0150554 A1 Jul. 14, 2005

(51) Int. Cl.
*F16K 11/20* (2006.01)
*F15B 13/04* (2006.01)

(52) U.S. Cl. .................................... 137/596.12; 91/449

(58) Field of Classification Search ................ 137/596, 137/596.12, 596.13; 91/449
See application file for complete search history.

(56) References Cited

U.S. PATENT DOCUMENTS 3,088,488 A * 5/1963 Benner et al. ................ 91/451
4,348,945 A * 9/1982 Schuhmacher ............... 91/452

* cited by examiner

*Primary Examiner*—Stephen M. Hepperle
(74) *Attorney, Agent, or Firm*—Schox, PLC

(57) ABSTRACT

The redundant valve system 10 of the preferred embodiment includes a first valve unit 12 and a second valve unit 14. The redundant valve system 10 is preferably used to connect a source 16 to a destination 18 and to connect the destination 18 to a reservoir 20. The first valve unit 12 and the second valve unit 14 are coupled to control fluid flow such that fluid flow is allowed in only one of two given directions at any given time, either from the source 16 to the destination 18 or from the destination 18 to the reservoir 20.

9 Claims, 1 Drawing Sheet

REDUNDANT VALVE SYSTEM

TECHNICAL FIELD

This invention relates generally to the field of fluid control systems, and more specifically to an improved redundant valve system in the field of fluid control systems.

BACKGROUND

Valves are used in many industrial applications for opening and closing presses, dispensing materials, and other similar functions. In such applications, valves are used to control the machinery as well as provide safety functionality. Typical applications use a redundant system of four valves: a primary valve and a secondary valve that control the fluid flow into a machine, and a primary valve and a secondary valve that control the release of fluid from a machine. If a fault occurs in either primary valve, its operation is then performed by the secondary (or "redundant") valve providing an added level of safety. The use of multiple valves adds to the cost of a valve control system making it desirable to reduce the number of valves. This invention provides such a system.

BRIEF DESCRIPTION OF THE FIGURE

The FIGURE is a schematic diagram of the preferred embodiment of the invention.

DESCRIPTION OF THE PREFERRED EMBODIMENT

Figure 1:
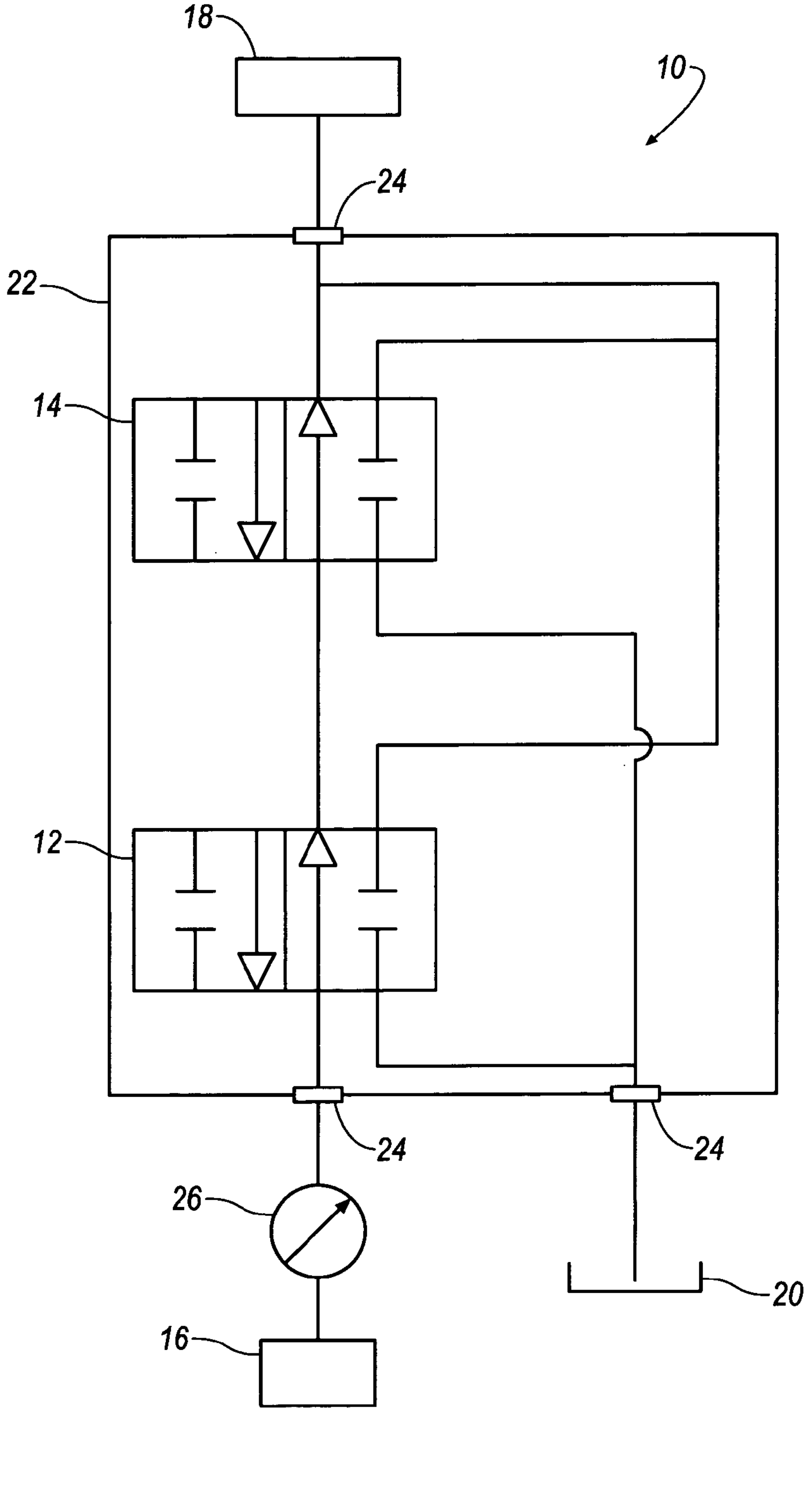

The following description of the preferred embodiment of the invention is not intended to limit the invention to this preferred embodiment, but rather to enable any person skilled in the art of fluid control systems to make and use this invention.

As shown in the FIGURE, the redundant valve system 10 of the preferred embodiment includes a first valve unit 12 and a second valve unit 14. The redundant valve system 10 is preferably used to connect a source 16 to a destination 18 and to connect the destination 18 to a reservoir 20. The redundant valve system 10 may alternatively be used to connect a source 16 to a destination 18 and to connect the destination 18 to the source 16. In this alternative embodiment, the source 16 functions as a source for a fluid and a reservoir for the fluid.

The first valve unit 12 and the second valve unit 14 function to selectively allow and prevent fluid flow between the source 16, the destination 18, and the reservoir 20. The first valve unit 12 preferably has two settings. The first setting allows fluid flow from the source 16 toward the destination 18 while preventing fluid flow from the destination 18 to the reservoir 20, and the second setting allows fluid flow from the destination 18 to the reservoir 20 while preventing fluid flow from the source 16 to the destination 18. Like the first valve unit 12, the second valve unit 14 preferably has two settings. The first setting allows fluid flow from the source 16 toward the destination 18 while preventing fluid flow from the destination 18 to the reservoir 20, and the second setting allows fluid flow from the destination 18 to the reservoir 20 while preventing fluid flow from the source 16 to the destination 18.

In the preferred embodiment, the first valve unit 12 and the second valve unit 14 are solenoid-actuated valves having two positions. In each position, the valve units preferably include a passage; one passage directs fluid flow in one direction towards the destination 18 and the other passage directs fluid flow in an opposite direction towards the reservoir 20. If the valve unit is in the first setting, fluid flow is allowed in the first passage, but prevented in the second passage. Similarly, if the valve unit is in the second setting, fluid flow is allowed in the second passage, but prevented in the first passage. In alternative embodiments, the first valve unit 12 and the second valve unit 14 may be any suitable valve that has separate flow passages such that at any given time fluid flow is occurring in only one passage. Further, the first valve unit 12 and the second valve unit 14 need not be the same type of valve unit.

The first valve unit 12 and the second valve unit 14 are coupled to control fluid flow such that fluid flow is allowed in only one of two given directions at any given time, either from the source 16 to the destination 18 or from the destination 18 to the reservoir 20. To connect the source 16 to the destination 18, the first valve unit 12 and the second valve unit 14 are arranged in series. Fluid flow originates at the source 16, travels through the first valve unit 12, travels through the second valve unit 14, and finally reaches the destination 18. To connect the destination 18 to the reservoir 20, the first valve unit 12 and the second valve unit 14 are arranged in parallel. In this direction, fluid flow originates at the destination 18, travels through either the first valve unit 12 or the second valve unit 14 or both the first valve unit 12 and the second valve unit 14, and finally reaches the reservoir 20.

The redundant valve system 10 provides a first (or "on") configuration allowing fluid flow from the source 16 to the destination 18 and a second (or "off") configuration allowing fluid flow from the destination 18 to the reservoir 20. The "on" configuration has the first valve unit 12 in the first setting and the second valve unit 14 in the first setting. Both the first valve unit 12 and the second valve unit 14 allow fluid flow to pass towards the destination 18 and prevent fluid flow towards the reservoir 20. The "off" configurations have either the first valve unit 12 or the second valve unit 14 or both the first valve unit 12 and the second valve unit 14 in the respective second settings. In this configuration, the valve unit in the respective second position allows fluid flow toward the reservoir 20 and prevents fluid flow toward the destination 18.

The "on" configuration allows fluid flow originating from the source 16 to reach the destination 18, which could be some type of pressure driven machinery. In such an application, situations may occur in which pressure will need to be immediately released from the machinery. Each of the "off" configurations provides this release. The redundancy of the second valve unit 14, provides added safety that if the first valve unit 12 fails to provide the "off" configuration the second valve unit 14 can provide the "off" configuration.

In the preferred embodiment, the redundant valve system 10 also includes a housing 22 that functions to completely encase the first valve unit 12 and the second valve unit 14. The housing 22 preferably includes three ports 24 for connecting to the source 16, to the destination 18, and to the reservoir 20. The housing 22 may alternatively include less or more ports depending on the specific arrangement of the redundant valve system 10. The housing 22 and the ports 24 are preferably made of convention materials and from conventional methods, but may alternatively be made of any suitable material and from any suitable method.

In the preferred embodiment, the redundant valve system 10 also includes a pump 26 located between the source 16 and the housing 22. The pump 26 functions to pressurize the fluid flowing between the source 16 and the destination 18. The pump 26 is preferably a conventional vane-type pump, but may alternatively be any suitable pump.

To make the valve system, the source 16, the housing 22, the destination 18, and the reservoir 20 are preferably connected with conventional piping and tubing, but may be alternatively connected with any suitable device that communicates fluid.

As a person skilled in the art of fluid control systems will recognize from the previous detailed description and from the FIGURES and claims, modifications and changes can be made to the preferred embodiment of the invention without departing from the scope of this invention defined in the following claims.

I claim:

1. A valve system for connecting a source to a destination and connecting the destination to a reservoir, comprising:

a first valve unit having a first setting and a second setting; and a second valve unit having a first setting and a second setting;

wherein the first valve unit and the second valve unit are configured to couple the source to the destination and couple the destination to the reservoir such that:

(1) a fluid is allowed to pass from the source to the destination and fluid is prevented from passing from the destination to the reservoir when said first valve unit is in said first setting and said second valve unit is in said first setting;

(2) a fluid is allowed to pass from the destination to the reservoir via said second valve unit and fluid is prevented from passing from the source to the destination when said first valve unit is in said first setting and said second valve unit is in said second setting;

(3) a fluid is allowed to pass from the destination to the reservoir via said first valve unit and fluid is prevented from passing from the source to the destination when said first valve unit is in said second setting and said second valve unit is in said first setting.

2. The valve system of claim 1, wherein said first valve unit and said second valve unit are further configured such that:

(4) a fluid is allowed to pass from the destination to the reservoir via said first valve unit and said second valve unit and fluid is prevented from passing from the source to the destination when said first valve unit is in said second setting and said second valve unit is in said second setting.

3. The valve system of claim 1, further comprising: a housing having a source port that is connectable to the source, a destination port that is connectable to the destination, and a reservoir port that is connectable to the reservoir.

4. The valve system of claim 3, wherein said housing encloses said first valve unit and said second valve unit.

5. The valve system of claim 4, further comprising: a pump arranged between the source and said source port.

6. A valve system for connecting a source to a destination and connecting the destination to a reservoir, comprising:

a first valve having a first passage that directs fluid towards the destination, a second passage that directs fluid towards the reservoir, a first position that allows fluid flow through the first passage and prevents fluid flow through the second passage, and a second position that prevents fluid flow through the first passage and allows fluid flow through the second passage; and a second valve having a first passage that directs fluid towards the destination, a second passage that directs fluid towards the reservoir, a first position that allows fluid flow through the first passage and prevents fluid flow through the second passage, and a second position that prevents fluid flow through the first passage and allows fluid flow through the second passage;

wherein the first passage of said first valve and the first passage of said second valve are arranged in series to connect the source to the destination, and the second passage of said first valve and the second passage of said second valve are arranged in parallel to connect the destination to the reservoir.

7. The valve system of claim 6, further comprising: a housing having a source port that is connectable to the source, a destination port that is connectable to the destination, and a reservoir port that is connectable to the reservoir.

8. The valve system of claim 7, wherein said housing encloses said first valve and said second valve.

9. The valve system of claim 8, further comprising: a pump arranged between the source and said source port.

* * * * *